US009594963B2

(12) United States Patent
Bobbitt et al.

(10) Patent No.: US 9,594,963 B2
(45) Date of Patent: *Mar. 14, 2017

(54) DETERMINATION OF OBJECT PRESENCE AND MOTION STATE (71) Applicant: INTERNATIONAL BUSINESS MACHINES CORPORATION, Armonk, NY (US)

(72) Inventors: Russell P. Bobbitt, New York, NY (US); Rogerio S. Feris, Hartford, CT (US); Yun Zhai, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/279,524

(22) Filed: Sep. 29, 2016

(65) Prior Publication Data

US 2017/0017845 A1 Jan. 19, 2017

Related U.S. Application Data (63) Continuation of application No. 14/711,871, filed on May 14, 2015, now Pat. No. 9,495,599, which is a
(Continued)

(51) Int. Cl.
*G06K 9/00* (2006.01)
*G06T 7/00* (2006.01)

(52) U.S. Cl.
CPC ........ *G06K 9/00771* (2013.01); *G06T 7/0081* (2013.01)

(58) Field of Classification Search
None
See application file for complete search history.

(56) References Cited

U.S. PATENT DOCUMENTS

2007/0217670 A1   9/2007   Bar-Am
2010/0054535 A1   3/2010   Brown et al.
(Continued)

FOREIGN PATENT DOCUMENTS

CN    101246547 A    8/2008
DE    102007018324 B3    5/2008
JP    59080085 A    5/1984

OTHER PUBLICATIONS

Oh, Sehchan, Sunghuk Park, and Changmu Lee. "Vision based platform monitoring system for railway station safety." 2007 7th International Conference on ITS Telecommunications. IEEE, 2007.*
(Continued)

*Primary Examiner* — Chan Park
*Assistant Examiner* — Raphael Schwartz
(74) *Attorney, Agent, or Firm* — Patrick J. Daugherty; Driggs, Hogg, Daugherty & Del Zoppo Co., LPA (57) ABSTRACT Foreground feature data and motion feature data is determined for frames of video data acquired from an object region of interest. The frames are labeled as "object present" if the determined foreground feature data value meets a threshold value, else as "object absent; and as "motion present" if the motion feature data meets a motion threshold, else as "static." The labels are used to classify segments of the video data comprising groups of consecutive video frames, namely as within a "no object present" segment for groups with "object absent" and "static" labels; within a "object present and in transition" segment for groups "object present" and "motion present" labels; and within a "object present and stopped" segment for groups with "object present" and "static" labels. The presence or motion state of an object at a time of inquiry is thereby determined from the respective segment classification.

17 Claims, 4 Drawing Sheets

Related U.S. Application Data continuation of application No. 13/590,269, filed on Aug. 21, 2012, now Pat. No. 9,070,020.

(56) References Cited

U.S. PATENT DOCUMENTS

| | | |
|---|---|---|
| 2010/0316257 A1 | 12/2010 | Xu et al. |
| 2010/0322516 A1 | 12/2010 | Xu et al. |
| 2012/0045090 A1 | 2/2012 | Bobbitt et al. |

OTHER PUBLICATIONS

Herrero-Jaraba, Elías, Carlos Orrite-Uruñuela, and Jesús Senar. "Detected motion classification with a double-background and a neighborhood-based difference." Pattern Recognition Letters 24.12 (2003): 2079-2092.*
Parisa Darvish Zadeh Varcheie et al, A Multiscale Region-Based Motion Detection and Background Subtraction Algorithm, Sensors (Basel, Switzerland), Jan. 28, 2010, pp. 1041-1061.
Herrero-Jaraba et al, Detected motion classification with a double-background and a neighborhood-based difference, Pattern Recognition Letters 24.12 (2003): 2079-2092.
Oh, Sehchan et al, Vision based platform monitoring system for railway station safety, Telecommunications, 2007. ITST'07. 7th International Conference on ITS. IEEE, 2007.
Dedeoglu, Yigithan, Moving object detection, tracking and classification for smart video surveillance. Diss. bilkent university, 2004.
U.S. Appl. No. 14/711,871, filed May 14, 2015.
Notice of Allowance (Mail Date Jul. 25, 2016) for U.S. Appl. No. 14/711,871, filed May 14, 2015.

* cited by examiner

DETERMINATION OF OBJECT PRESENCE AND MOTION STATE

FIELD OF THE INVENTION

Embodiments of the present invention relate to applying computer vision techniques to automatically determine the presence or absence of objects, as well as their motion states, within stations or other specific locations.

BACKGROUND

Reliably detecting the presence or absence of an object, such as a train in railway interchange environments such as station platforms, and on tracks in train and subway stations is desirable for railway system management. Automated video systems may be used to monitor pluralities of such railway interchange environments from a remote, centralized point, enabling efficiencies in centralizing and providing comprehensive and contextual train traffic management. Such systems may be useful in alerting train system managers to collision and pedestrian hazards posed by moving trains, for example by providing advance warnings to train operators or other parties remote from a station stop that another train is unexpectedly occupying or entering a station platform area, early enough to enable avoidance measures. Alarms from such systems may notify a train engineer to begin stopping a train early enough, so that its inertia may be safely overcome prior to entry of a problematic area.

However, video monitoring systems suffer from a variety of limitations. For example, the capabilities of such systems may be limited by reliance on human perception to both review video feeds of pluralities of different station areas, and make the necessary determinations to spot and abate problems in a timely fashion. The number of personnel available to watch video footage from vast camera arrays is generally limited by budgetary and other resource limitations, as is the ability of any one human monitor to monitor and perceive a threat in multiple, simultaneous video feeds. The process of watching video streams is resource consuming, suffers from high costs of employing security personnel, and efficiency in such systems to detect events of interest is also limited by the constraints of human comprehension.

The field of intelligent visual surveillance seeks to address this problem by applying computer vision techniques to video stream inputs to automatically detect the presence or absence of trains at given track locations. However, the efficacy of such systems in real-world conditions is limited. Accurately determining the presence or absence of a train at a given train platform area may be challenging, in one aspect due to a large variability in amounts of reflect light generated by changing weather conditions (sunny, cloudy, nighttime, transient moving cloud shadows, etc.). A wide variety of reflected or occluded lighting profiles must be processed that may be caused by different train cars, the numbers of train cars, speeds or movement relative to the video cameras, and the different sizes, shapes and reflective behaviors of the train car element surfaces. Strong visual textures are generally observed in rail track areas, and even a minor change in lighting may cause incorrect foreground classification in video analytic systems. Thus, high rates of false positive detections, or low rates of accuracy in detecting true events, generally limit the usefulness and trustworthiness of such systems.

BRIEF SUMMARY

In one embodiment of the present invention, a method for applying computer vision techniques to automatically detect and classify the presence or absence of an object within a region of interest includes determining for an auto-correction time period a distribution of object present and object absent labels that are assigned one each to each of a plurality of the video segments of video image scene data acquired from a region of interest. The video segments are each assigned the object present label in response to determining that foreground feature data values meet a background subtraction threshold value indicative of a presence of a foreground object having a specified size; the object absent label in response to determining that the foreground feature data values do not meet the background subtraction threshold value; a motion present label in response to determining that motion feature data values for the frames differ from motion feature data values of previous frames by a motion threshold value that is selected as indicative of a change in visual features consistent with movement of the object within the frame data; and a static label in response to determining that the motion feature data values for the frames do not differ from the motion feature data values of the previous frames by the motion threshold value. In response to determining that the distribution of the object present and the object absent labels does not meet an expected distribution for the auto-correction time period, aspects exchange the object present and the object absent labels that are assigned to each of the video frames. Accordingly, segments of the input video data comprising consecutive video frames assigned the object absent label and the static label are classified as "no object present" segments; segments comprising consecutive video frames that are each assigned the object present label and the motion present label are classified as "object present and in transition" segments; and segments of the input video data comprising consecutive video frames that are each assigned the object present label and the static label are classified as "object present and stopped" segments.

In another embodiment, an article of manufacture has a tangible computer-readable storage medium with computer readable program code embodied therewith, the computer readable program code comprising instructions that, when executed by a computer processing unit, cause the computer processing unit to determine for an auto-correction time period a distribution of object present and object absent labels that are assigned one each to each of a plurality of the video segments of video image scene data acquired from a region of interest. The video segments are each assigned the object present label in response to determining that foreground feature data values meet a background subtraction threshold value indicative of a presence of a foreground object having a specified size; the object absent label in response to determining that the foreground feature data values do not meet the background subtraction threshold value; a motion present label in response to determining that motion feature data values for the frames differ from motion feature data values of previous frames by a motion threshold value that is selected as indicative of a change in visual features consistent with movement of the object within the frame data; and a static label in response to determining that the motion feature data values for the frames do not differ from the motion feature data values of the previous frames by the motion threshold value. In response to determining that the distribution of the object present and the object absent labels does not meet an expected distribution for the auto-correction time period, aspects exchange the object present and the object absent labels that are assigned to each of the video frames. Accordingly, segments of the input video data comprising consecutive video frames assigned the object absent label and the static label are classified as "no object present" segments; segments comprising consecutive video frames that are each assigned the object present label and the motion present label are classified as "object present and in transition" segments; and segments of the input video data comprising consecutive video frames that are each assigned the object present label and the static label are classified as "object present and stopped" segments.

In another embodiment, a system has a processing unit, computer readable memory and a tangible computer-readable storage medium with program instructions, wherein the processing unit, when executing the stored program instructions, determines for an auto-correction time period a distribution of object present and object absent labels that are assigned one each to each of a plurality of the video segments of video image scene data acquired from a region of interest. The video segments are each assigned the object present label in response to determining that foreground feature data values meet a background subtraction threshold value indicative of a presence of a foreground object having a specified size; the object absent label in response to determining that the foreground feature data values do not meet the background subtraction threshold value; a motion present label in response to determining that motion feature data values for the frames differ from motion feature data values of previous frames by a motion threshold value that is selected as indicative of a change in visual features consistent with movement of the object within the frame data; and a static label in response to determining that the motion feature data values for the frames do not differ from the motion feature data values of the previous frames by the motion threshold value. In response to determining that the distribution of the object present and the object absent labels does not meet an expected distribution for the auto-correction time period, aspects exchange the object present and the object absent labels that are assigned to each of the video frames. Accordingly, segments of the input video data comprising consecutive video frames assigned the object absent label and the static label are classified as "no object present" segments; segments comprising consecutive video frames that are each assigned the object present label and the motion present label are classified as "object present and in transition" segments; and segments of the input video data comprising consecutive video frames that are each assigned the object present label and the static label are classified as "object present and stopped" segments.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Intelligent visual surveillance comprehends applying computer vision techniques to automatically detect specific events in video stream data, including detecting and distinguishing static from moving objects. Foreground analysis-based background modeling may be used for direct object detection and tracking processes, wherein a train is detected whenever a large portion of foreground object is detected in a given monitoring region. However, railway environments present a number of challenges to automated video monitoring implementations, and the performance of background modeling techniques may be unreliable in detecting whether a train is present or not.

More particularly, effectively using video analytics to detect train presence status at platforms tracks or in train and subway stations or other railway environments generally requires a very low false alarm rate for event triggering; else the usefulness of the system is diminished. For example, a maximum of five false positives per analysis task per camera per day may be required in some applications. This poses a very challenging situation for tasks that are directly related to activities around train platform and other areas where trains frequently pass by and cause interferences, such as rail crossing detection, entering tunnel detection, alerting of people close to a platform edge or of people falling onto track, etc. Generally, a majority of such false alarms are caused by passing trains due to their large size, reflecting lighting, speed, etc. Therefore, being able to accurately determine train's presence is very important in false alarm rate control Background analysis may not be robust enough in difficult lighting environments. Outdoor locations are subject to wide varieties of lighting changes due to weather and sunlight variability. Such problems are more prominent in rail track areas, where strong textures are observed and a minor change in lighting is likely to cause an incorrect foreground classification. While some systems implement interest point analysis methods to overcome certain deficiencies in foreground analysis method results, interest point analysis lacks reliability in low lighting environments where no texture can be seen and, consequently, no interest points can be found.

Figure 1:
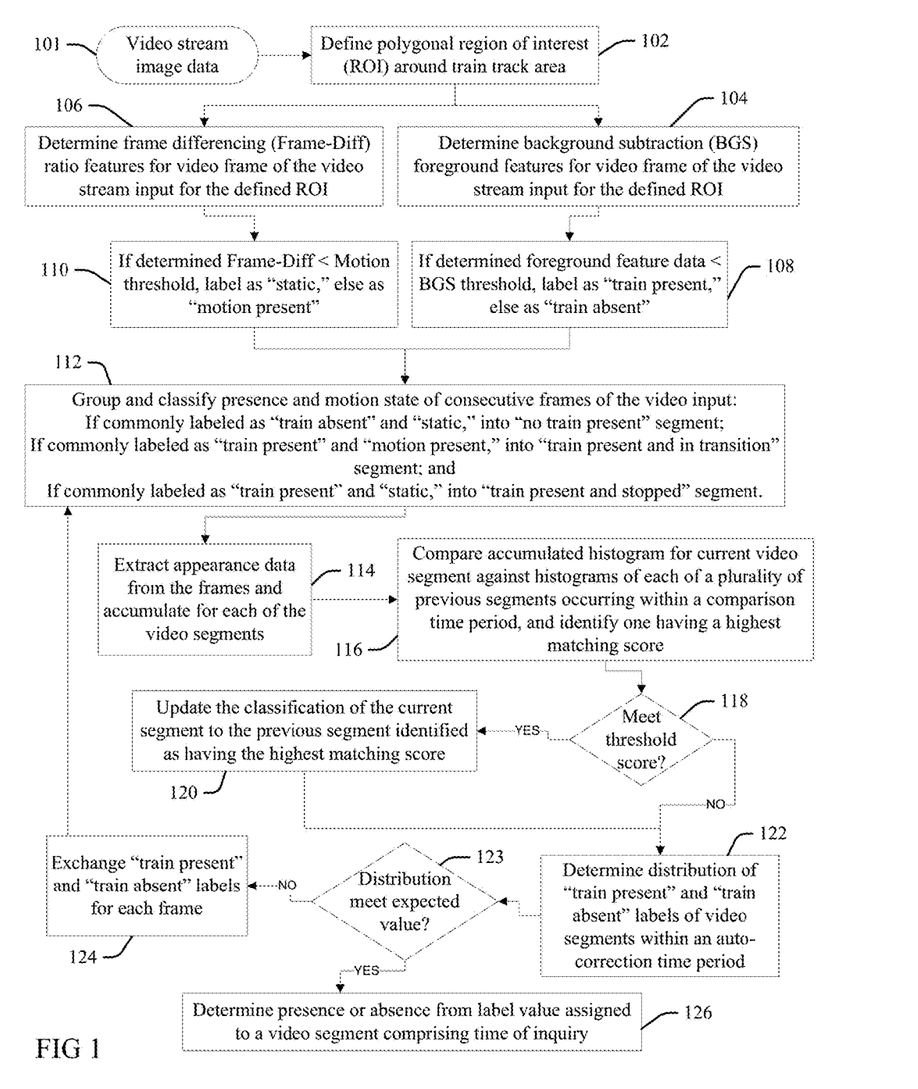
FIG. 1 is a block diagram illustration of an embodiment of the present invention that applies computer vision techniques to automatically detect and classify the presence or absence and motion of a train within a railway track area.
Figure 2:
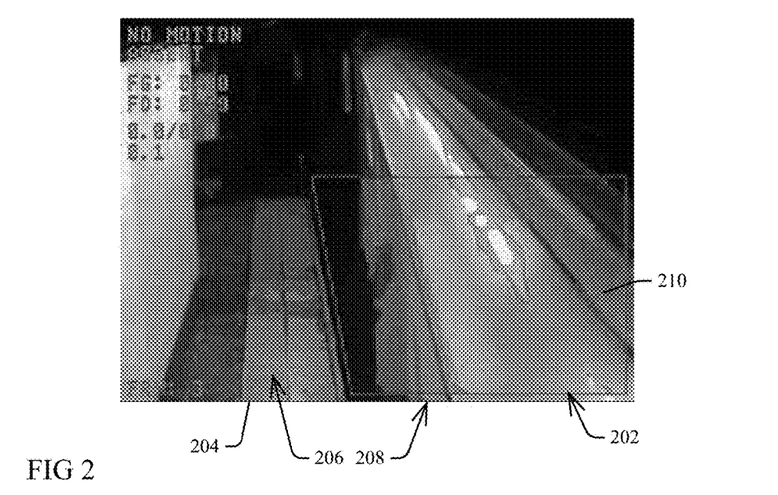
FIG. 2 is a photographic illustration of a field of view of video stream input comprising a region of interest according to the present invention.

FIG. 1 illustrates one embodiment of a method, system or process according to the present invention for applying computer vision techniques to automatically detect and classify the presence or absence of a train within a given railway track area. At 102 a region of interest (ROI) is defined around a train track area within an image scene of a stream of video image data 101. FIG. 2 illustrates one example of a field of view 204 of the video stream input 101 that comprises a pedestrian platform 206 that is visually distinguishable from an adjacent rail track area 208. A polygonal ROI 202 is defined to encompass a portion of the track area 208, but not any portion of the pedestrian platform 206, to thereby detect the presence of a train 210 when located within the defined ROI 202 but avoid false alarms triggered by the motion of pedestrians. More particularly, the ROI 202 is generally defined at 102 (FIG. 1) to encompass an area within the field of view 204 wherein the only moving objects distinguishable from background (static) objects in the image should be train cars, thereby avoid false alarms that may be generated by the movement of pedestrians or other, non-train car object movements. However, it will be understood that some embodiments may not limit the ROI to train tracks, but may include other areas, and use other processes to distinguish train car motion features for the motion features of other objects. ROI's with shapes other than polygonal may also be practiced (for example, round, oval, conical, etc.). Further, some embodiments may focus the entire field of view 204 on only a track area, and thus the entire field of view 204 may be the ROI for the image data.

Referring again to FIG. 1, two different image data features are determined or computed for incoming video frames of the video stream input 101 within the defined ROI 202: foreground features that are distinguished via background subtraction (BGS) mask processes at 104, and frame differencing (Frame-Diff) ratio features determined at 106 with respect to motion features in the video data.

With respect to the BGS process at 104, rather than detecting moving objects as is typically the focus in the prior art, the ROI 202 and the BGS process 104 are selected to detect and distinguish train car foreground objects that do not belong to background environment settings. At 108 the process compares the BGS values determined for each of the video frames at 104 to a BGS threshold value that is selected as indicative of the presence of a foreground object having the size of a train car, and labels each frame accordingly as "train present" or "train absent." If the determined BGS value meets (is equal to or greater than) this BGS threshold, it may be inferred that a train car-sized object is present in the image and the video frame is accordingly labeled as "train present." Otherwise, if the determined BGS value is less than the threshold, this indicates that any detected foreground object is too small to be a train car (for example, a pedestrian or other smaller object, or a transient shadow or other lighting event), and the process may infer that a train is not present within the frame and label it as "train absent."

Motion features are captured by the frame-differencing feature process at 106 via computing ratios of differences in motion features accumulated over time between consecutive frames of the video input 101. Frame differencing ratios are determined for each frame as a ration of motion feature data determined for the frame to a value of motion feature data determined for an immediately previous frame of the plurality of frames. At 110 the Frame-Diff ratio value determined for each of the video frames is compared to a motion threshold, a ratio value selected as indicative of a change in visual features consistent with the movement of a train car within the frame relative to a previous frame. If the determined Frame-Diff ratio value meets (is equal to or greater than) the motion threshold, it may be inferred that objects in the image are in motion and the video frame is labeled as "motion present"; otherwise, if less than the motion threshold, it may be inferred that objects in the image are not moving, static, and the video frame is labeled as "static".

At 112 the input video 101 is segmented into one of three presence and motion state groups of consecutive video frames that are commonly labeled at 108 and 110 according to the following:
  (i) each group of consecutive frames that are labeled at 108 as "train absent," and labeled at 110 as "static," are classified into a "no train present" segment of the video input, signifying that no train is at the station ROI 202;
  (ii) each group of consecutive frames that are labeled at 108 as "train present," and labeled at 110 as "motion present," are classified into a "train present and in transition" segment of the video input; signifying that a train is at the station and within the ROI 202, generally pulling into or pulling out of the station; and
  (iii) each group of consecutive frames that are labeled at 108 as "train present," and labeled at 110 as "static" are classified into a "train present and stopped" segment of the video input; signifying that a train is at the station and stopped within the ROI 202, generally for passenger egress and ingress.

The present embodiment also provides processes for backward matching of the train presence and motion classifications of the video segments. More particularly, appearance features are extracted from the frames and accumulated over time for each of the motion state segments at 114, from a first frame in each segment up to the point in time at which the classification and labeling decision is made at 112 to transition to a next, different segment. In the present embodiment, color features are extracted from the monitoring ROI and accumulated in a color histogram, though other features may be extracted and accumulated via other methodology in other embodiments. In some embodiments, a latency delay time is specified at the beginning of each motion state segment, so that the accumulated appearance can be constructed with a latency that stops the system from responding to lighting changes due to cloud movements and other transient situations that might otherwise cause a false determination of the presence of a train. Examples of the delay time period include one and two second periods, and still others may be practiced.

At 116 the accumulated histogram for a current video segment is compared against the histograms of each of a plurality of previous (precedent) segments that each occurred within a comparison time period of the current segment, and a best-matching one of the previous motion state segments is identified, for example the one having a highest matching score. The comparison time period is selected to encompass each of the three different motion segment classifications determined at 112 under anticipated or historical train movement timings for the ROI 202. For example, if the ROI 202 is of a train station wherein trains stop for no longer than one minute to allow for passenger egress and ingress, then one exemplary comparison time period is five minutes, which should capture each of the three motion states associated with a stopped train. Other comparison time periods may be specified, in response to schedules or dynamic observations of actual train movements.

If the best matching histogram is sufficiently close to the histogram of the current segment, for example has a matching score that meets a threshold score at 118, then at 120 the current segment classification is updated to the classification of the previous segment that is identified as having the highest matching score, which may thereby change the classification initially determined for the current segment at 112 if said previous segment has a different classification.

The present embodiment also provides for an auto-correction process. At 122 the distribution of "train present" and "train absent" labels of the video segments is determined within an auto-correction time period, which is selected to encompass a plurality of train stopping events over a time frame longer than an anticipated (for example, scheduled) or actual (dynamically observed) time that a train is stopped within the ROI for one stopping event. This determination may occur periodically. If at 123 the distribution of the "train present" and "train absent" labels does not meet an expected distribution over the auto-correction time period, this is indicative of an error in the original labeling process at 112, and accordingly at 124 the "train present" or "train absent" labels of the video frames are exchanged and the segmentation classifications accordingly re-determined at 112 for the video input 101. Thus, at 126 the presence or absence of a train within the ROI of the video scene at a time of inquiry is determined from the "train present" or "train absent" label of the video segment classification comprehending the time of inquiry.

Figure 3:
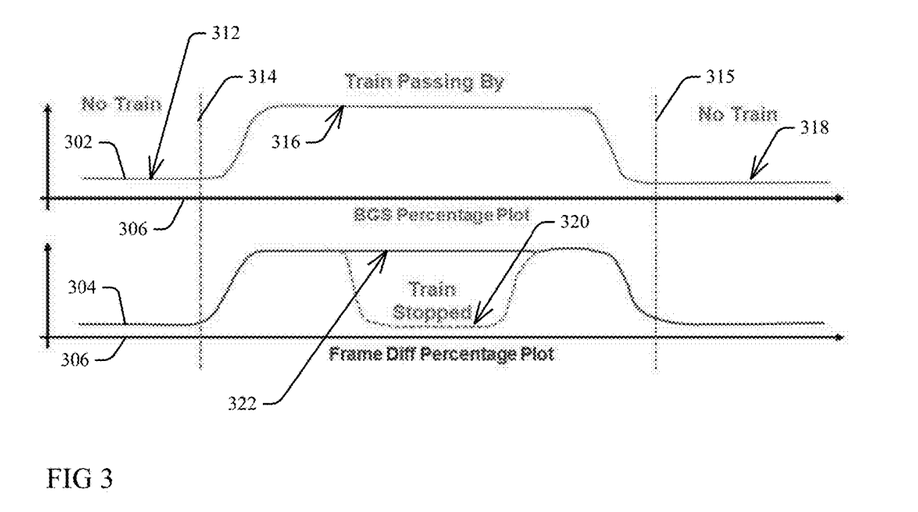
FIG. 3 is a graphic illustration of foreground feature values determined via background subtraction processes, and frame difference values of motion features, with respect to a common timeline, according to the present invention.

FIG. 3 graphically plots two examples of the determined BGS feature values and Frame-Diff features over a common (horizontal axis) timeline 306 for train presence events at the station platform of FIG. 2 for two idealized situations, wherein no noise impacts the respective values. The upper graph plotline 302 represents values of both of the determined BGS feature values and Frame-Diff features with respect to the case of a passing train (or briefly stopped train), wherein both values are low at 312 before the train enters the station, upon entry of the train into the station at 314 increase and remain steady at a high level 316, then drop again to a low level 318 when the train leaves the station at 315. An ideal moving train passing through the ROI without stopping should consistently impose large level of BGS area values and frame-differencing mask feature values at 316 which meet the respective thresholds at 108 and 110 of FIG. 1, and thus result in classifying a video segment comprising these frames as "train present and in transition" at 112.

The lower graph plotline 304 illustrates another case wherein the train enters the ROI at 314 then stops at the platform 206 and remains static long enough for the Frame-Diff feature values to drop back to its initial low or zero value at 320 (as there should be no differences between consecutive frames of the video input while the train is static), while continuing to impose a large BGS area value in the ROI at 322. Ideally the process of FIG. 1 should classify a video segment comprising frames covering this period at 112 as "train present and stopped."

Figure 4:
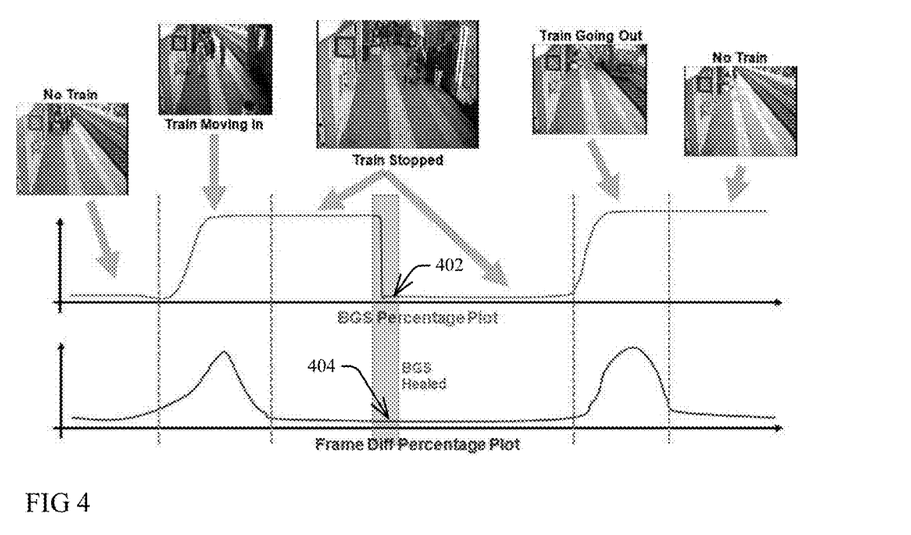
FIG. 4 is a graphic illustration of foreground feature values determined via background subtraction processes, and frame difference values of motion features, with respect to a common timeline, and with respect to image data represented by photographic images depicted within the graphic illustration.

However, when the train stops at the platform for a long time problems may arise with the BGS values determined at 104. BGS modeling methods are generally based on online updating mechanisms wherein more recent observations gradually take over the models corresponding to the background. Therefore, if a train stops for a long enough period of time it may be learned into and become part of the background in a process is known as "healing". For example, referring now to FIG. 4, after a train is stopped for a long enough time the BGS may suddenly drop at 402 due to the healing process; since the Frame-Diff feature value at this point in time 404 has also dropped back to its initial low or zero value, the initial classification made at 112 of FIG. 1 for this video segment would be "no train present," which is incorrect.

Figure 5:
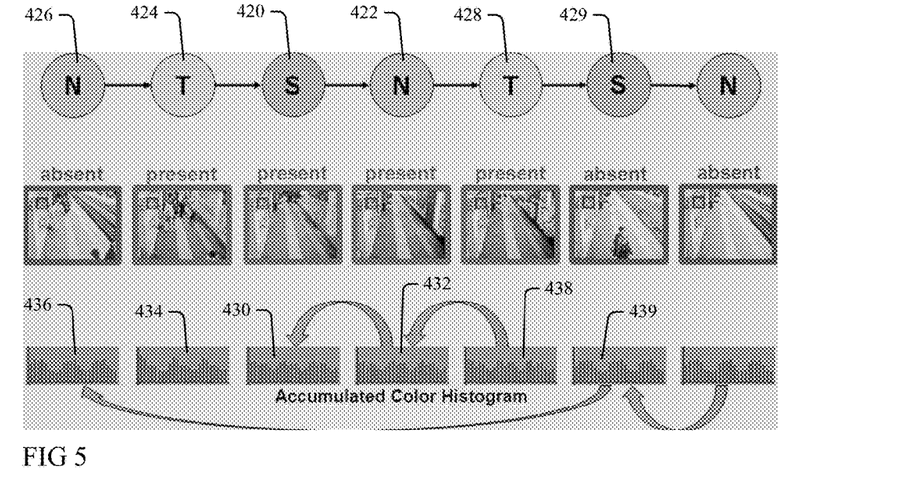
FIG. 5 is a state diagram illustrating accumulated histograms and train presence and motion classifications with respect to image data represented by photographic images according to the present invention.

This error is corrected by the backward motion state matching process at 114, 116, 118 and 120 of FIG. 1. FIG. 5 illustrates the classification at 112 of FIG. 1 of seven different segments of video of a train entering and stopping at the station platform of FIG. 2, wherein the label "N" signifies the "no train present" classification, the label "T" signifies the "train present and in transition" classification, and label "S" signifies the "train present and stopped" classification. When the BGS value of the stopped train drops from its high value during the segment 420 due to healing (at 402, FIG. 4), the classification process at 112 determines the beginning of a new segment of video with a different train presence/motion state and classifies this new segment as N 422, erroneously signifying "no train present."

However, comparing the accumulated histogram 432 of segment N 422 (at 116, FIG. 1) to the accumulated histograms 430, 434 and 436 of the respective preceding video segments S 420, T 424 and N 426 finds that the histogram 430 of the "train present and stopped" segment S 420 is the highest matching one. Since the match is close enough to meet the threshold score (at 118, FIG. 1) the classification of the current segment 422 is changed to the "train present and stopped" classification of the proceeding segment 422, thus now correctly identifying that a train is present and remains stopped at the platform.

In a similar fashion, comparison of the accumulated histogram 439 of the segment 429 erroneously labeled as "S" to the accumulated histograms 430, 432, 434, 436 and 438 of the respective preceding video segments 420, 422, 424, 436 and 428 finds that the histogram 436 of the "N" ("no train present") classification 426 labeled is the highest matching one, and since the match is close enough to meet the threshold score (at 118, FIG. 1) the label of said segment 429 is changed to this "no train present" classification of the proceeding segment 426, thus now correctly identifying that a train is not present and stopped at the platform during the segment 429.

Another problem may occur in the automated processes of FIG. 1, namely that it may not be verified or guaranteed that the system will start when there is no train present in the monitoring ROI. If there is a train incidentally static within the ROI 202 when the system starts, a BGS process initialized at 104 may construct a background model comprising the train and thereby return a low BGS value even though a static train is present. Since the motion features captured from images of the static train by the frame-differencing feature process at 106 will determine a "no-motion" value, the first video segment comprising the static train may be erroneously labeled as "No Train." Comparisons to subsequent video segment histograms may result in spreading this error throughout subsequent label assignments, causing a steady inversion of correct to erroneous classifications via the backward matching processes at 114, 116, 118 and 120. This problem may be corrected via the auto-correction mechanism at 122 and 124 by analyzing actual train absence/presence label distributions and correcting their designations if necessary.

More particularly, each ROI should have an expected or observed distribution of "train present" relative to "train absent" labels. In one example, the loading of trains on the track in the ROI over a long time period comprising a plurality of discrete, historical train stops as the station may indicate that the majority of time there should be no train present on the track: for example, a train may only be scheduled or otherwise expected to stop once, for at most a five minute period, during any given hour on any given day. Therefore, reviewing the labels applied at 112 as updated/corrected through the backward motion process effected at 120 should find that "No train" labels should be in the majority over a long time period, for example over any auto-correction time period of at least 30 minutes. If they are not, then it may be inferred that the "presence"/"absence" decisions are incorrectly reversed (due to the presence of a static train at the initiation of the BGS process) and that they should be reversed back along all the history records, and the classification accordingly re-determined at 112. Therefore, if the system gets into a sub-optimal state as a result of starting when a train is at the platform, or a train stopped for an excessive time due to exception, the process of FIG. 1 will be able to switch back into a correct, optimal state after a period of time and start making correct decisions.

In one embodiment, the extracted color features are accumulated in the color histogram at 114 with a fixed weighting factor that is selected to bias or more heavily weight the most recent observations, and thereby enable the most recent observations to dominate the accumulated model. In one example, new observations are multiplied by a weighting factor of 0.1, and all accumulated observations in the histogram are multiplied by 0.9, and the factored products of the new and old observations are then combined to generate new, updated accumulated values for the histogram, thereby progressively biasing the accumulated histogram to reflect a most recent observation with more weight (represent 10% of the accumulated data) over the older observations as the observations accumulate beyond nine total observations, wherein each of the older observations becomes a smaller percentage of the aggregate 90% allocated to all previous observations.

Figure 6:
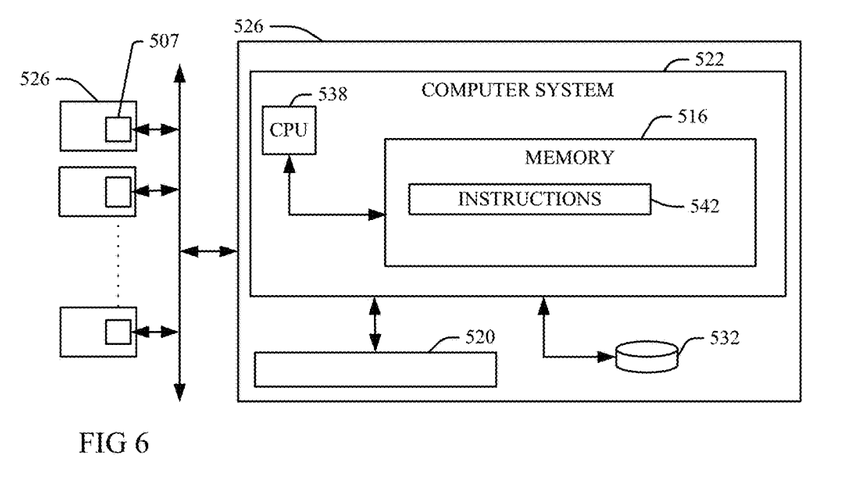
FIG. 6 is a block diagram illustration of a computer system implementation of an embodiment of the present invention.

Referring now to FIG. 6, an exemplary computerized implementation of an embodiment of the present invention includes a computer system or other programmable device 522 in communication with video data input devices 526 (cameras, hard drive, network ports, etc.) for providing video data input for applying computer vision techniques to automatically detect and classify the presence or absence of a train within a railway track area region of interest 507 to determining a presence or a motion state of a train within the region of interest of the video scene as described above with respect to FIGS. 1-5. Instructions 542 reside within computer readable code in a computer readable memory 516, or in a computer readable storage system 532, or other tangible computer readable storage medium that is accessed through a computer network infrastructure 526 by a Central Processing Unit (CPU) 538. Thus, the instructions, when implemented by the processing unit 538, cause the processing unit 538 to perform computer vision technique analysis of image data for automatically detecting and classifying the presence or absence of a train within a railway track area region of interest with respect to FIGS. 1-5 as described above.

Embodiments of the present invention may also perform process steps of the invention on a subscription, advertising, and/or fee basis. That is, a service provider could offer to integrate computer-readable program code into the computer system 522 to enable the computer system 522 to perform computer vision technique analysis of image data for automatically detecting and classifying the presence or absence and motion state of a train within a railway track area region of interest as described above with respect to FIGS. 1-6. The service provider can create, maintain, and support, etc., a computer infrastructure such as the computer system 522, network environment 526, or parts thereof, that perform the process steps of the invention for one or more customers. In return, the service provider can receive payment from the customer(s) under a subscription and/or fee agreement and/ or the service provider can receive payment from the sale of advertising content to one or more third parties. Services may comprise one or more of: (1) installing program code on a computing device, such as the computer device 522, from a tangible computer-readable medium device 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for applying computer vision techniques to automatically detect and classify the presence or absence of an object within a region of interest, the method comprising executing on a processor the steps of:

determining for an auto-correction time period a distribution of object present and object absent labels that are assigned one each to each of a plurality of the video segments of video image scene data acquired from a region of interest, wherein the video segments are each assigned the object present label in response to determining that foreground feature data values meet a background subtraction threshold value indicative of a presence of a foreground object having a specified size, the object absent label in response to determining that the foreground feature data values do not meet the background subtraction threshold value, a motion present label in response to determining that motion feature data values for the frames differ from motion feature data values of previous frames by a motion threshold value that is selected as indicative of a change in visual features consistent with movement of the object within the frame data, and a static label in response to determining that the motion feature data values for the frames do not differ from the motion feature data values of the previous frames by the motion threshold value;

in response to determining that the distribution of the object present and the object absent labels does not meet an expected distribution for the auto-correction time period, exchanging the object present and the object absent labels that are assigned to each of the video frames;

classifying segments of the input video data comprising consecutive video frames that are each assigned the object absent label and the static label as "no object present" segments;

classifying segments of the input video data comprising consecutive video frames that are each assigned the object present label and the motion present label as "object present and in transition" segments; and classifying segments of the input video data comprising consecutive video frames that are each assigned the object present label and the static label as "object present and stopped" segments.

2. The method of claim 1, further comprising:

integrating computer-readable program code into a computer system comprising the processor, a computer readable memory and a computer readable hardware storage device, wherein the computer readable program code is embodied on the computer readable hardware storage device and comprises instructions for execution by the processor via the computer readable memory that cause the processor to perform the steps of determining for the auto-correction time period the distribution of the object present and the object absent labels, exchanging the assigned object present and object absent labels in response to determining that the distribution of the object present and object absent labels does not meet the expected distribution for the auto-correction time period, classifying the segments of the input video data comprising consecutive video frames that are each assigned the object absent label and the static label as the "no object present" segments, classifying the segments of the input video data comprising consecutive video frames that are each assigned the object present label and the motion present label as the "object present and in transition" segments, and classifying the segments of the input video data comprising consecutive video frames that are each assigned the object present label and the static label as the "object present and stopped" segments.

3. The method of claim 1, further comprising:
accumulating appearance features extracted from each of the frames into histograms for each of the classified segments of the input video data;
comparing the accumulated histogram for a current one of the classified segments to the histograms of each of a plurality of segments that are previous in time to the current segment, wherein each of the compared plurality of segments occurred within a comparison time period of the current motion state segment, and wherein the comparison time period is selected to encompass each of the "object present and stopped" segment, the "object present and in transition" segment and the "no object present" segment under anticipated or historical object movement timings for the region of interest; and
changing a current classification of the current segment to the "object present and stopped" classification, the "object present and in transition" classification or the "no object present" classification of a one of the compared plurality of segments that has an accumulated histogram that best matches the accumulated histogram for the current segment.

4. The method of claim 3, further comprising:
selecting the auto-correction time period to encompass a plurality of object stopping events over a time frame longer than an anticipated or dynamically observed time that an object is stopped within the region of interest for one stopping event.

5. The method of claim 4, wherein the extracted, accumulated features are color features, and the accumulated histograms are color histograms.

6. The method of claim 4, wherein the step of accumulating the appearance features extracted from each the frames into the histograms for each of the classified segments of the input video data further comprises:
constructing the accumulated appearance histogram after elapse of a latency delay time period from a beginning of the classified segment.

7. The method of claim 6, wherein the latency delay time period ranges from one to two seconds.

8. The method of claim 6, wherein the object is a train car, further comprising:
defining the region of interest to comprise a train track area within an image scene of a stream of the video image data, and to exclude a pedestrian platform within the image scene that is adjacent to and visually distinguishable from the object track area.

9. An article of manufacture, comprising:
a computer readable hardware storage device having computer readable program code embodied therewith, the computer readable program code comprising instructions for execution by a computer processing unit that cause the computer processing unit to:
determine for an auto-correction time period a distribution of object present and object absent labels that are assigned one each to each of a plurality of the video segments of video image scene data acquired from a region of interest, wherein the video segments are each assigned the object present label in response to determining that foreground feature data values meet a background subtraction threshold value indicative of a presence of a foreground object having a specified size, the object absent label in response to determining that the foreground feature data values do not meet the background subtraction threshold value, a motion present label in response to determining that motion feature data values for the frames differ from motion feature data values of previous frames by a motion threshold value that is selected as indicative of a change in visual features consistent with movement of the object within the frame data, and a static label in response to determining that the motion feature data values for the frames do not differ from the motion feature data values of the previous frames by the motion threshold value;
in response to determining that the distribution of the object present and the object absent labels does not meet an expected distribution for the auto-correction time period, exchange the object present and the object absent labels that are assigned to each of the video frames;
classify segments of the input video data comprising consecutive video frames that are each assigned the object absent label and the static label as "no object present" segments;
classify segments of the input video data comprising consecutive video frames that are each assigned the object present label and the motion present label as "object present and in transition" segments; and
classify segments of the input video data comprising consecutive video frames that are each assigned the object present label and the static label as "object present and stopped" segments.

10. The article of manufacture of claim 9, wherein the computer readable program code instructions for execution by the computer processing unit, further cause the computer processing unit to:
accumulate appearance features extracted from each of the frames into histograms for each of the classified segments of the input video data;
compare the accumulated histogram for a current one of the classified segments to the histograms of each of a plurality of segments that are previous in time to the current segment, wherein each of the compared plurality of segments occurred within a comparison time period of the current motion state segment, and wherein the comparison time period is selected to encompass each of the "object present and stopped" segment, the "object present and in transition" segment and the "no object present" segment under anticipated or historical object movement timings for the region of interest; and
change a current classification of the current segment to the "object present and stopped" classification, the "object present and in transition" classification or the "no object present" classification of a one of the compared plurality of segments that has an accumulated histogram that best matches the accumulated histogram for the current segment.

11. The article of manufacture of claim 10, wherein the computer readable program code instructions for execution by the computer processing unit, further cause the computer processing unit to select the auto-correction time period to encompass a plurality of object stopping events over a time frame longer than an anticipated or dynamically observed time that an object is stopped within the region of interest for one stopping event.

12. The article of manufacture of claim 11, wherein the computer readable program code instructions for execution by the computer processing unit, further cause the computer processing unit to accumulate the appearance features extracted from each the frames into the histograms for each of the classified segments of the input video data further by constructing the accumulated appearance histogram after elapse of a latency delay time period from a beginning of the classified segment.

13. The article of manufacture of claim 12, wherein the object is a train car, and wherein the computer readable program code instructions for execution by the computer processing unit, further cause the computer processing unit to define the region of interest to comprise a train track area within an image scene of a stream of the video image data, and to exclude a pedestrian platform within the image scene that is adjacent to and visually distinguishable from the object track area.

14. A system, comprising:
a processing unit;
a computer readable memory in communication with the processing unit; and
a computer-readable storage medium in communication with the processing unit;
wherein the processing unit executes program instructions stored on the computer-readable storage medium via the computer readable memory and thereby:
determines for an auto-correction time period a distribution of object present and object absent labels that are assigned one each to each of a plurality of the video segments of video image scene data acquired from a region of interest, wherein the video segments are each assigned the object present label in response to determining that foreground feature data values meet a background subtraction threshold value indicative of a presence of a foreground object having a specified size, the object absent label in response to determining that the foreground feature data values do not meet the background subtraction threshold value, a motion present label in response to determining that motion feature data values for the frames differ from motion feature data values of previous frames by a motion threshold value that is selected as indicative of a change in visual features consistent with movement of the object within the frame data, and a static label in response to determining that the motion feature data values for the frames do not differ from the motion feature data values of the previous frames by the motion threshold value;
in response to determining that the distribution of the object present and the object absent labels does not meet an expected distribution for the auto-correction time period, exchanges the object present and the object absent labels that are assigned to each of the video frames;
classifies segments of the input video data comprising consecutive video frames that are each assigned the object absent label and the static label as "no object present" segments;
classifies segments of the input video data comprising consecutive video frames that are each assigned the object present label and the motion present label as "object present and in transition" segments; and
classifies segments of the input video data comprising consecutive video frames that are each assigned the object present label and the static label as "object present and stopped" segments.

15. The system of claim 14, wherein the processing unit executes the program instructions stored on the computer-readable storage medium via the computer readable memory, and thereby further:
accumulates appearance features extracted from each of the frames into histograms for each of the classified segments of the input video data;
compares the accumulated histogram for a current one of the classified segments to the histograms of each of a plurality of segments that are previous in time to the current segment, wherein each of the compared plurality of segments occurred within a comparison time period of the current motion state segment, and wherein the comparison time period is selected to encompass each of the "object present and stopped" segment, the "object present and in transition" segment and the "no object present" segment under anticipated or historical object movement timings for the region of interest; and
changes a current classification of the current segment to the "object present and stopped" classification, the "object present and in transition" classification or the "no object present" classification of a one of the compared plurality of segments that has an accumulated histogram that best matches the accumulated histogram for the current segment.

16. The system of claim 15, wherein the extracted, accumulated features are color features;
wherein the accumulated histograms are color histograms;
wherein the processing unit executes the program instructions stored on the computer-readable storage medium via the computer readable memory, and thereby accumulates the appearance features extracted from each of the frames into the histograms for each of the classified segments of the input video data by constructing the accumulated appearance histogram after elapse of a latency delay time period from a beginning of the classified segment; and
wherein the latency delay time period ranges from one to two seconds.

17. The system of claim 16, wherein the object is a train car, and wherein the processing unit executes the program instructions stored on the computer-readable storage medium via the computer readable memory, and thereby defines the region of interest to comprise a train track area within an image scene of a stream of the video image data, and to exclude a pedestrian platform within the image scene that is adjacent to and visually distinguishable from the object track area.

* * * * *